(12) United States Patent
Bierner et al.

(10) Patent No.: US 8,463,791 B1
(45) Date of Patent: Jun. 11, 2013

(54) METHOD AND APPARATUS FOR CREATION OF WEB DOCUMENT TITLES OPTIMIZED FOR SEARCH ENGINES

(75) Inventors: Gann Bierner, Oakland, CA (US); Edwin Cooper, Oakland, CA (US)

(73) Assignee: Pearl.com LLC, San Francisco, CA (US)

( * ) Notice: Subject to any disclaimer, the term of this patent is extended or adjusted under 35 U.S.C. 154(b) by 0 days.

(21) Appl. No.: 13/598,450

(22) Filed: Aug. 29, 2012

Related U.S. Application Data

(63) Continuation of application No. 13/464,196, filed on May 4, 2012, now Pat. No. 8,280,888.

(51) Int. Cl.
*G06F 17/30* (2006.01)
*G06F 7/00* (2006.01)
*G06F 17/28* (2006.01)

(52) U.S. Cl.
USPC .............................................. 707/738; 704/4

(58) Field of Classification Search
USPC .............................................. 707/738; 704/4
See application file for complete search history.

(56) References Cited

U.S. PATENT DOCUMENTS

| | | | |
|---|---|---|---|
| 5,384,703 | A | 1/1995 | Withgott et al. |
| 5,642,520 | A | 6/1997 | Takeshita et al. |
| 5,918,240 | A | 6/1999 | Kupiec et al. |
| 5,937,422 | A | 8/1999 | Nelson et al. |
| 5,960,383 | A | 9/1999 | Fleischer |
| 6,172,675 | B1 | 1/2001 | Ahmad et al. |
| 6,289,304 | B1 | 9/2001 | Grefenstette |
| 6,638,317 | B2 | 10/2003 | Nakao |
| 6,963,830 | B1 | 11/2005 | Nakao |
| 7,200,808 | B1 | 4/2007 | Nagao |
| 7,376,893 | B2 | 5/2008 | Chen et al. |
| 8,005,665 | B2 | 8/2011 | Chaney et al. |
| 8,280,888 | B1 | 10/2012 | Bierner et al. |
| 2005/0278314 | A1* | 12/2005 | Buchheit ........................ 707/3 |

OTHER PUBLICATIONS

Notice of Allowance and Fee(s) Due from U.S. Appl. No. 13/464,196 dated Aug. 13, 2012.

* cited by examiner

*Primary Examiner* — Charles Lu
(74) *Attorney, Agent, or Firm* — Zilka-Kotab, PC

(57) ABSTRACT

Embodiments of the present invention further provide systems and methods for creating question and document titles representing the relevant content of the question or document and optimized for a search engine where the title is of the appropriate character length such that search engines will view and index the entire title.

10 Claims, 11 Drawing Sheets

METHOD AND APPARATUS FOR CREATION OF WEB DOCUMENT TITLES OPTIMIZED FOR SEARCH ENGINES

RELATED APPLICATIONS

The present application is a continuation of U.S. patent application Ser. No. 13/464,196 filed on May 4, 2012, which is related to U.S. patent application Ser. No. 12/854,838 filed on Aug. 11, 2010, U.S. patent application Ser. No. 12/854,836 filed on Aug. 11, 2010, U.S. patent application Ser. No. 12/854,849 filed on Aug. 11, 2010, and U.S. patent application Ser. No. 12/854,846 filed on Aug. 11, 2010, which are all incorporated herein by reference. The present application is also related to and incorporates by reference U.S. patent application Ser. No. 13/464,167 filed on May 4, 2012, U.S. patent application Ser. No. 13/464,269 filed on May 4, 2012, U.S. patent application Ser. No. 13/464,287 filed on May 4, 2012, U.S. patent application Ser. No. 13/464,230 filed on May 4, 2012, and U.S. patent application Ser. No. 13/464,252 filed on May 4, 2012.

FIELD OF INVENTION

The present application relates generally to the field of computer technology and, in specific exemplary embodiments, to methods and systems for automatically creating web document titles that are optimized for search engines.

BACKGROUND

In the age of the Internet, having a prominent online presence has become important to the success of any business, be it the traditional brick and mortar business or an online enterprise. One of the main components of success is online visibility. With the ever expanding size of the Internet and as search engines become more popular, online visibility and success directly correlates to how a company's online content ranks the results of relevant queries submitted to popular search engines. Being ranked number one or two listing on the first page of popular search engines like Binge, Yahoo® and Google® may be the Holy Grail of online visibility for companies who seek to achieve high online visibility. One example of an Internet based business is an online consultation website. Presently, many online websites allow for exchange of information. Some of these websites allow a user to post a question and one or more other users may reply. Often, any user on the Internet may be able to post the reply. However, a main requirement for success of an online consultation system is dependent on the quality of service it can provide. Therefore, an online consultation website that allows users to communicate with verified experts and ask questions and receives answers from these experts on various subject matters is very attractive to users. Most users would find the online consultation website by entering their question or some relevant query in one of the popular search engines. Therefore, having content that allows the online consultation businesses content to achieve a high placement on the search engine results is important and highly desirable. A successful online consultation site may have hundreds of subject categories and generate thousands of relevant question and answer threads. This relevant content is a valuable asset because Internet search engines will index and present excerpts of this content and links to the consultation website as the source of the content in response to users' queries. However, since the ranking algorithm of most search engines focuses only on the first seventy or so characters in a document (effectively becoming the document title), content need to be optimized for search engines. Any form of search engine optimization (SEO) must account for the title character length limitation, and optimize the content accordingly.

BRIEF DESCRIPTION OF DRAWINGS

The appended drawings are merely used to illustrate exemplary embodiments of the present invention and cannot be considered as limiting its scope.

DETAILED DESCRIPTION

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on quality control of experts, the embodiments are given merely for clarity and disclosure. Alternative embodiments may employ other systems and methods and are considered as being within the scope of the present invention.

Embodiments of the present invention provide systems and methods for automatically creating optimized search engine titles that are more representative of the content of a document, and more relevant to the search engine crawlers, resulting in higher placement when the search engine results are displayed. In exemplary embodiments, content is processed to identify and extract representative and relevant keywords allowing the content to be summarized in an optimum fashion, resulting in a desirable treatment by search engine crawlers and a higher placement of the content when search engines present results in response to a related query.

Embodiments of the present invention further provide systems and methods for promoting a business with an online presence, through search engine optimization resulting in higher placement or visibility of the content of the business's website in the search engine results.

Figure 1:
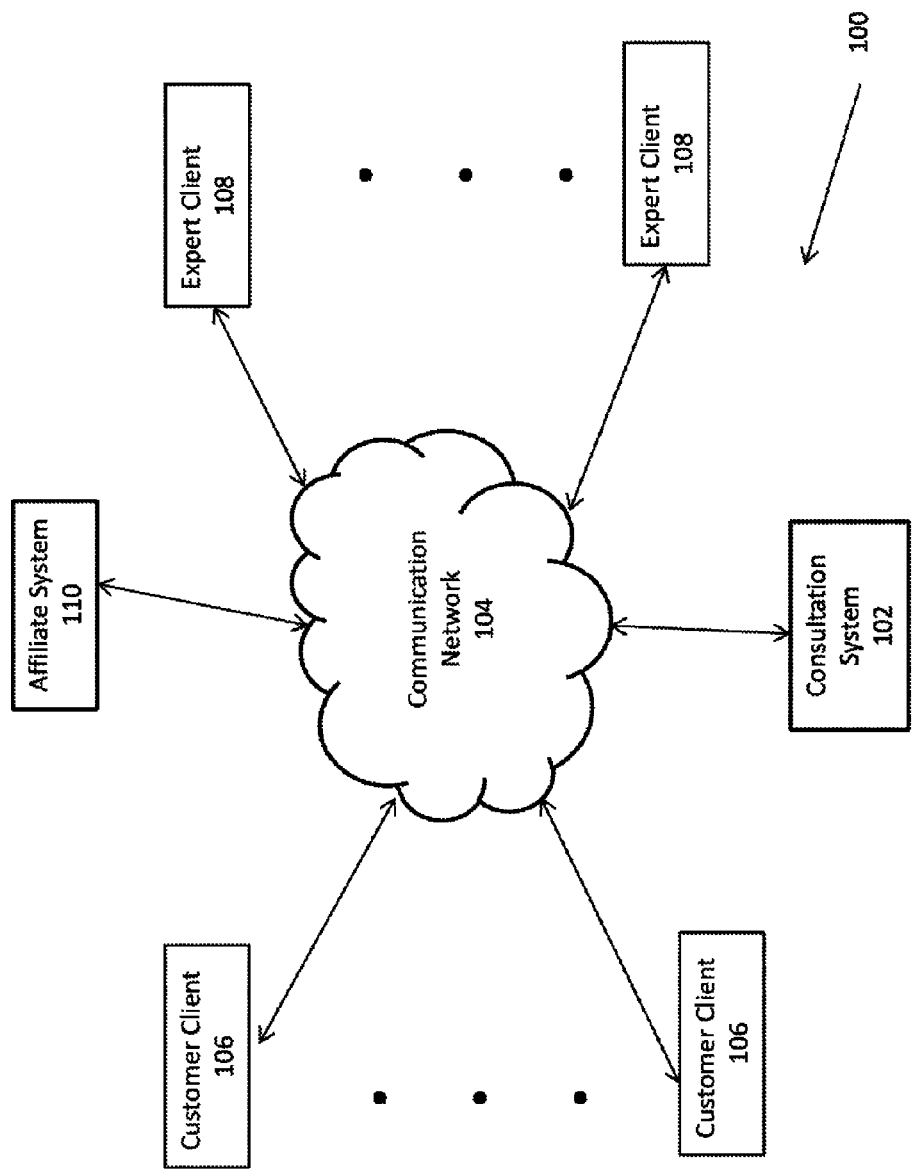
FIG. 1 is a diagram of an exemplary environment in which embodiments of the present invention may be practiced.

In order to illustrate the application of the present invention, an online consultation system and website is selected as an example of a business with an online presence. It would be apparent to one of skill in the art that the teachings of the present invention are not limited to the examples used herein and the systems and methods of the present invention may have broader applications. FIG. 1 shows an exemplary environment 100 of an online consultation system and website in which embodiments of the present invention may be practiced. The exemplary environment 100 comprises a consultation system 102 coupled via a communications network 104 to one or more users 106 and expert users 108. User 106, client, customer, customer client refers to a user of the consultation system 102. The communication network 104 may comprise one or more local area networks or wide area networks such as, for example, the Internet and telephone systems.

In exemplary embodiments, the consultation system 102 provides a forum where users may post or pose questions and for which expert users may provide answers. The consultation system 102 may provide the forum via a website. In some embodiments, at least portions of the forum (e.g., asking of questions or receiving of responses) may occur via the website, mobile phone, other websites, text messaging, telephone, video. VoIP, or other computer software applications. Because the consultation system 102 is network based e.g., Internet, public switched telephone network (PSTN), cellular network, the users using the consultation system 102 and expert users providing answers may be geographically dispersed (e.g., may be located anywhere in the world). As a result an expert user may provide answers to a user thousands of miles away. Additionally, the consultation system 102 allows a large number of users and expert users to exchange information at the same time and at any time.

By using embodiments of the present invention, a user posting a question may easily obtain a tailored answer. Accordingly, one or more of the methodologies discussed herein may obviate a need for additional searching for answers, which may have the technical effect of reducing computing resources used by one or more devices within the system. Examples of such computing resources include, without limitation, processor cycles, network traffic, memory usage, storage space, and power consumption.

In various embodiments, a user may pose a question and one or more expert users may provide answers. In various embodiments, the question may be matched with a category of expert users, more specific set of expert users, or even individual expert users, sometimes on a rotating basis by user selection, a keyword based algorithm, a quality based algorithm (or score or rating), or other sorting mechanism that may include considerations such as, for example, likely location or time zone. A back-and-forth communication can occur. The user may accept an answer provided by one or more of the expert users. In an alternative embodiment, the user may be deemed to have accepted the answer if the user does not reject: it. By accepting the answer, the user validates the expert user's answer which, in turn, may boost a score or rating associated with the expert user. The user may also pay the expert user for any accepted answers and may add a bonus. The user may also leave positive, neutral or negative feedback regarding the expert user. More details regarding the consultation system 102 and its example functions will be discussed in connection with FIG. 2 below.

The exemplary user 106 is a device associated with a user accessing the consultation system 102 (e.g., via a website, telephone number, text message identifier, or other contact means associated with the consultation system 102). The user may comprise any individual who has a question or is interested in finding answers to previously asked questions. The user 106 comprises a computing device (e.g., laptop, PDA, cellular phone) which has communication network access ability. For example, the user 106 may be a desktop computer initiating a browser for access to information on the communication network 104. The user 106 may also be associated with other devices for communication such as a telephone.

In exemplary embodiments, the expert user 108 is a device associated with an expert user. The expert user, by definition, may be any person that has, or entity whose members have, knowledge and appropriate qualifications relating to a particular subject matter. Some examples of expert subject matters include health (e.g., dental), medical (e.g., eye or pediatrics), legal (e.g., employment, intellectual property, or personal injury law), car, tax, computer, electronics, parenting, relationships, and so forth. Almost any subject matter that may be of interest to a user for which an expert user has knowledge and appropriate qualifications may be contemplated. The expert user may, but does not necessarily need to, have a license, certification or degree in a particular subject matter. For example, a car expert user may have practical experience working the past 20 years at a car repair shop. In some embodiments, the expert: user may be a user the expert user posts a question).

The expert user 108 may comprise a computing device (e.g., laptop, PDA, cellular phone) which has communication network access ability. For example, the expert user 108 may be a desktop computer initiating a browser to exchange information via the communication network 104 with the consultation system 102. The expert user 108 may also be associated with other devices for communication such as a telephone.

In accordance with one embodiment, an affiliate system 110 may be provided in the exemplary environment 100. The affiliate system 110 may comprise an affiliate website or other portal which may include some of the components of the consultation system 102 or direct their users to the consultation system 102. The affiliate system 110 may also be associated with other devices for communication such as a telephone. For example, the affiliate system 110 may provide a website for a car group. A link or question box may be provided on the affiliate website to allow members of the car group to ask questions. Answers in response to the questions may be provided, in part, from the consultation system 102, or the member asking question on the affiliate website may be redirected to the consultation system 102 for the answer. The environment 100 of FIG. 1 is exemplary. Alternative embodiments may comprise any number of consultation systems 102, user 106, expert user 108, and affiliate systems 110 coupled together via any type of one or more communication networks 104, and still be within the scope of exemplary embodiments of the present invention. For example, while only one consultation system 102 is shown in the environment 100, alternative embodiments may comprise more than one consultation system 102. For instance, the consultation systems 102 may be regionally established.

Figure 2:
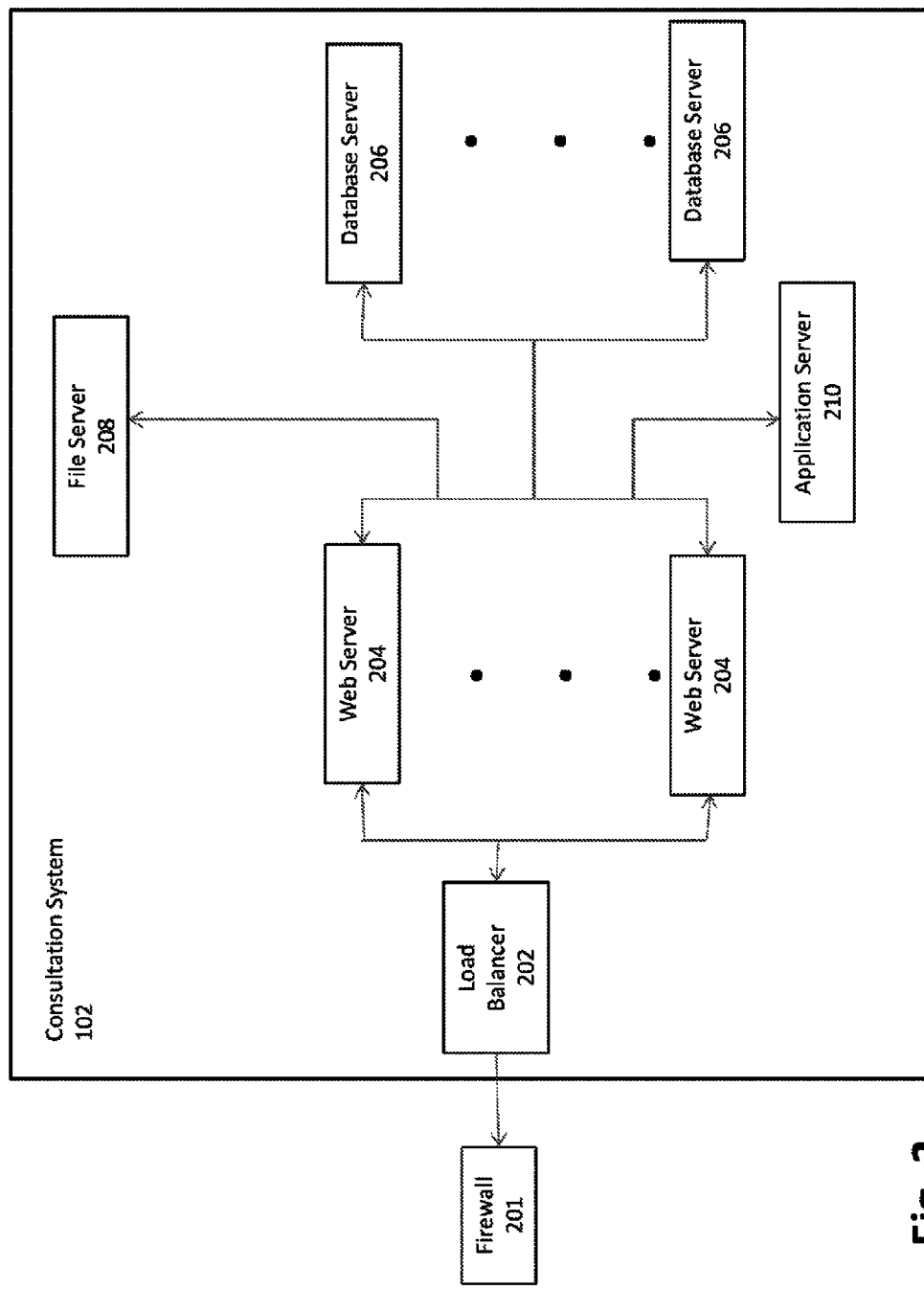
FIG. 2 is a block diagram of an exemplary consultation system.

Referring now to FIG. 2, the consultation system 102 is shown in more detail. In exemplary embodiments, the consultation system 102 may comprise a load balancer 202 which distributes work between two or more web servers 204 in order to optimize resource utilization and minimize response time. In some embodiments, a firewall 201 may be provided prior to the load balancer 202.

In exemplary embodiments, the web servers 204 are responsible for accepting communications from the user 106 (e.g., request or question) and expert user 108 (e.g., response) and serving the response including data content. In some instances, the request and response may be in HTTP or HTTPS which will result in HTML documents and linked objects (e.g., images) being provided to the user and expert user 106 and 108. The communications may include, for example, questions from the users, answers from the experts user, acceptance from the user, payment information, account update information, videos, documents, photographs and voice. The web server 204 will be discussed in more detail in connection with FIG. 3.

Information used by the web server 204 to generate responses may be obtained from one or more database servers 206 and a file server 208. The exemplary database servers 206 store data or are coupled with data repositories storing data used by the consultation system 102. Examples of data include user information (e.g., username, e-mail address, credit card or other payment information), expert information (e.g., name, licenses, certifications, education and work history), previously asked questions and corresponding answers, and transaction information (e.g., payment, accepts, etc.). Essentially any data may be stored in, or accessed by, the database servers 206 including every user and expert user interaction with the consultation system 102. Examples of interactions include how many questions the user has asked, which expert users provided answers to the questions, and whether the user accepted the answers and paid the expert user.

Content on the database servers 206 (or accessed by the database servers 206) may be organized into tables, and the tables may be linked together. For example, there may be one table for every question that has been previously asked, another table for posts (e.g., answers) to each question, and other tables for users and experts users. In one example of the present invention, over 430 tables or spreadsheets are linked together.

In some embodiments, the database servers 206 may include logic to access the data stored in the tables. The logic may comprise a plurality of queries (e.g., thousands of queries) that are pre-written to access the data. For example, one query may be directed to determining every question that a particular user has asked. In this example, a user table may be searched based on this query to determine the user's unique user name or identity. Once the user name is determined, a question table may be accessed to find all questions ever asked by a user having the particular user name. Alternatively, the question and answer thread stored on the database servers 206 once redacted to remove personally identifiable information, may be made available to popular search engine crawlers. The search engines may index and classify the content stored on the database servers 206 and make the extracts of content available to users in response to their search queries. If the indexed content is relevant to the user query, a link to that content is presented in the search results. Although the exact algorithm by which each search engine matches and ranks the relevant content to the user query, it is accepted that search engines look at the first seventy or one hundred characters of the content and rank the relevant content stored on the database server 206 and present the results in response to the user query, in a great part based on the relevancy of the content to the user query.

It should be noted that the functions of the database server 206 may be embodied within the web server 204. For example, the database servers 206 may be replaced by database storage devices or repositories located at the web servers 204. Therefore, any reference to the database server 206 and database storage device are interchangeable. Alternatively, some or all of the query logic may be embodied within the web server 204.

In exemplary embodiments, a plurality of database servers 206 is provided. The plurality of database servers 206 may share data and thus be identical for close to being identical). By having identical database servers 206, load balancing and database backup may be provided. For example, if two database servers 206 are embodied in the consultation system 102, then half of the data accesses or queries may be directed to one database server 206 and the other half to the second database server 206.

The file server 208 stores or accesses files such as, for example, pictures, videos, voice files, PDF documents, Word documents, and PowerPoint presentations. When a particular file is requested or required in order to generate a response, the web server 204 may query the file server 208 for the file. Alternatively, the files may be stored at the database server 206 or other database storage devices, for example.

An application server 210 may also be provided in the consultation system 102. The application server 210 may provide applications and functions that are centralized to the consultation system 102. For example, the application server 210 may perform credit card processing with a bank that is coupled to the consultation system 102 via a network (e.g., the communication network 104).

It should be appreciated that in alternative embodiments, the consultation system 102 may include fewer or more components than shown in FIG. 2. For example, the consultation system 102 may comprise any number of web servers 204, database servers 206, file server 208, and application server 210. In another example, the file server 208 and application server 210 may be removed from the consultation system 102 and their functions performed by other servers in the consultation system 102. It will also be appreciated that the various servers may be embodied within each other and/or the consultation system 102 may be embodied within a single server. For example, the database server 206 may be embodied, as a storage device within the web server 204. It is also noted that the various servers of the consultation system 102 may be geographically dispersed within the exemplary environment 100.

Figure 3:
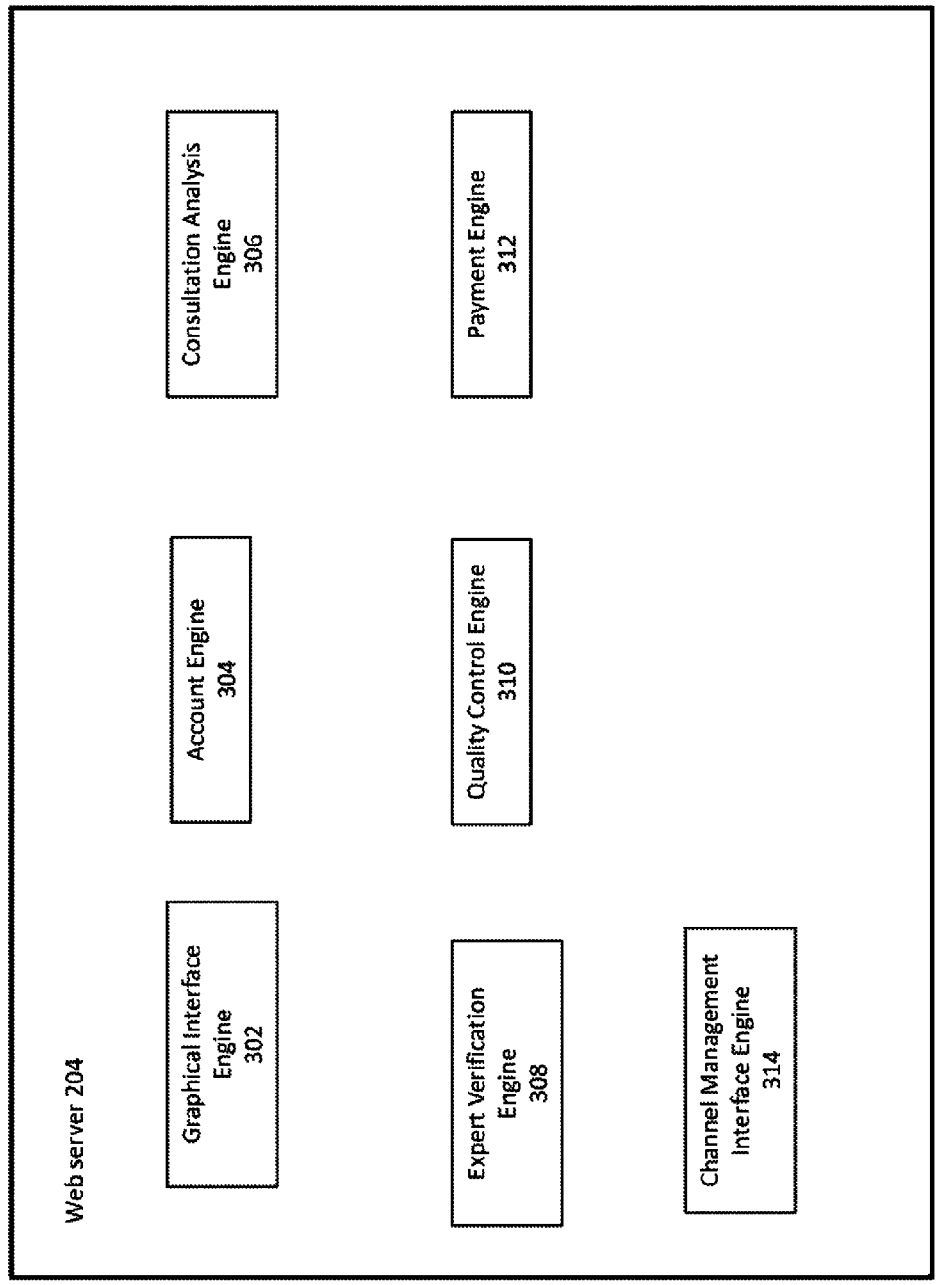
FIG. 3 is a block diagram of an exemplary web server.

Referring now to FIG. 3, one of the exemplary web servers 204 is shown in more detail. As discussed, the web servers 204 share in the workload in order to provide optimized performance. As such, each of the web servers 204 will include similar engines and modules. In the exemplary embodiment of FIG. 3, the web server 204 comprises a graphical interface engine 302, an accounts engine 304, a consultation analysis engine 306, an expert verification engine 308, a quality control engine 310, a payment engine 312, and a channel management engine 314 communicatively coupled together.

The exemplary graphical interface engine 302 generates graphical representations provided via the web page. In exemplary embodiments, the graphical interface engine 302 builds a page (e.g., made up of HTML, Javascript, CSS, sound, video, images, and other multimedia) that is presented to the user 106 or expert user 108. The page comprises static text (e.g., "Welcome to JustAnswer.") and dynamic data (e.g., "Hello, hulagirl. You joined 3 months ago; have asked 17 questions; have accepted 12 answers."). The dynamic data may be obtained, at least in part, from the database servers 206. In exemplary embodiments, the dynamic data may be retrieved using querying logic associated with the web server 204, the database server 206, or a combination of both, as discussed above.

The exemplary accounts engine 304 sets up, and maintains user accounts with the consultation system 102. Initially, the accounts engine 304 may provide a registration page via the graphical interface engine 302 for an individual (e.g., a user or expert) to fill out. The information collected via the registration page may be stored in the database server 206. Examples of information include user name, e-mail address, and billing and payment information. With respect to experts, the accounts engine may also collect information regarding the identity of the expert, information on credentials (e.g., license and certification numbers, degrees including university attended and years of attendance, employment history), and other data relating to the expert and the expert's application. Accounts for users may be automatically established and activated based on certain actions taken by the user, such as asking a question, agreeing to the terms of the consultation system, or providing payment. However, experts, in accordance with exemplary embodiments, proceed through an acceptance and verification process. If accepted, an expert account may then be established and activated by the accounts engine 304. The verification process will be discussed in more detail below.

The consultation analysis engine 306 manages answers in response to questions which have been posted to the consultation system 102. In exemplary embodiments, the consultation analysis engine 306 will receive questions along with indications of a category or subject matter each question is directed to from users. In various embodiments, a user may utilize a question page to enter a question which the user wants an expert to answer. As further described below, in many cases a user may initially find the consultation website after having first having entered a query in a search engine. Having found the online consultation website, the user may enter his or her question in the field for entering the question, as well as providing relevant information relating to the question make and model of a car), as well as a selection box for selecting a subject matter expert under which the question should be posted to. In exemplary embodiments, other pages may be presented to the user before or after the question is submitted to experts, to obtain further data from or provide data to the user. For example, a question regarding how to change the battery in a certain type of car may be categorized as a car question or a question for that type of car. In some embodiments, the question will then be posted to a car care portion (e.g., car care web pages) of the consultation system 102. The question is also recorded into a corresponding table in the database server 206 (e.g., in a question table) and the user name of the user may also be entered into a corresponding table (e.g., user table). In some instances, the question may be outputted back to the user so that the user may confirm the question or edit the question if needed. The user may also provide an amount that the user is willing to pay for an accepted answer, in some embodiments, as an amount selected by the user from different options offered to the user. A discussion on creating new categories is provided in more detail below.

Once the question is posted on the consultation system 102, experts may provide answers in response to the question. The questions may be posted to a general or subject matter specific question list of recent questions that have been posted by users, a more specific group of experts, or certain experts one-at-a-time. In various embodiments, the question list may be sorted by certain types of information such as time of posting, the amount the user is willing to pay (e.g., value), the user's history of accepting previous answers, information regarding the subject matter of the question, or whether replies have been previously posted. Experts may periodically review the question list or other communications alerting them to questions to determine if there are any questions that the expert would like to answer. The expert may base their determination, in part, on the complexity of the question, their expertise, the amount the user is willing to pay for an answer, or the user's history of accepting previous answers. In various embodiments, the user is able to place a deposit and name a price for an answer when posting the question or place the deposit, after an expert has answered.

Should the expert decide to answer a question or request further information, an indication is provided to the user that there is an answer being offered or a request for further information, sometimes in the form of the answer or the request itself. The indication may also comprise an e-mail, text message, or pop-up notification to the user. In some cases, the user may place a deposit (e.g., the amount agreed upon to be paid if an answer is accepted) after being given the opportunity to view a profile of the expert offering the answer or a portion of the answer.

The answer is provided to the user. The answer may be displayed on a web page (e.g., an answer page), provided via a chat session, provided via a voice or text message, provided via video, provided by a software application, provided by other social media means (e.g., social networking sites where the user has a personal profile or page), or provided by telephone, mobile phone, or VoIP. Upon review of answers posted in response to a question, the user decides if any of the answers are acceptable to the user. The user may accept one or more answers that are posted. In exemplary embodiments, the user will pay the expert posting any accepted answers. If a particular answer is exceptional, in exemplary embodiments, the user may also provide a bonus to the expert providing the exceptional answer. When the user accepts an answer, monies from the deposits may also be paid to a host of the question and answers platform (e.g., host of the consultation system 102).

In various embodiments, different pricing options may be used for determining what a user may pay for getting an answer to a question or what an expert may be paid for providing an answer. In one embodiment, the pricing options may vary for each category or subcategory based on a variety of factors. These factors may include, for example, question length, time of day, day of week, location, or the ability of a user to pay. Additionally, discounts may be offered (e.g., two for one, ask one question get second for 50% off, free for pro bono users). In other embodiments, pricing may be selected and paid for by third-parties (e.g. employers of the users). In yet other embodiments, a user may subscribe to a subscription plan (e.g., unlimited questions each month for a particular fee or up to 10 questions each month for another fee). In other embodiments, a user or expert may be allowed to adjust the price prior to, during, or after the interaction between the user and the expert.

Acceptance and non-acceptance actions are tracked by the consultation analysis engine 306. For example, every user's accept-to-question ratio may be tracked and may be published to experts. Thus, if the ratio is low, experts may not answer the user's questions in the future. Furthermore, the user's question posting privileges may be suspended or the user may be removed from the consultation system 102 if the ratio is low or falls below a ratio threshold. The tracked acceptance and non-acceptance information is stored to the database server 206, and may be used to evaluate the quality of the experts as is discussed herein. The consultation analysis engine 306 will be discussed in more detail in connection with FIG. 4 below.

The user may also provide comments and feedback after viewing or accepting one or more answers. The feedback may be provided as, for example, a written comment, star rating, numerical scale rating, or any other form of rating. The feedback is stored to the database server 206, and may be used in the quality control processing. User satisfaction surveys may also be sent to collect data on the user's experience with the site, the expert, or the answer the user received.

According to some embodiments, if the question has been previously answered, a query of the database server 206 may be performed. The answers to previously asked questions may be stored in corresponding answer tables in the database server 206. These embodiments may occur when, for example, a user searches (e.g., using Google) for previous questions and answers. Multiple instances of access to the same questions and/or answers may be provided via a cache. Some or all users may also be allowed to search some or all previous questions or answers via a search tool on the website, or some or all previous questions or answers may be displayed to users at the discretion of the host, affiliate, or expert of the consultation system.

In many cases, the user may find the online consultation site after having first submitted a query to one of the popular search engines. The query may include what the user thinks is the critical information characterizing his search. For example, a user seeking help with the replacement of his car battery on a Honda Civic 1992 may enter the query "1992 Honda Civic battery replacement." The search engine logic, would then compare the query to its database of ranked content in the Internet, and through its proprietary algorithm find and list, in a ranked order the various search results, one of which may be link to the online consultation website because the online consultation website would have previous question and answer threads that closely matches the present user's query.

The exemplary expert verification engine 308 performs verification and acceptance of experts. In accordance with exemplary embodiments, the expert verification engine 308 verifies information provided by the potential experts (or experts) or receives verification data used to verify the experts' identities or credentials. The verification may occur prior to allowing the expert to join the consultation system 102. Alternatively, the verification may occur any time after the expert has joined the consultation system 102. More than one verification may be performed for each expert, by requirement or by the expert's choice.

In exemplary embodiments, the quality control engine 310 evaluates experts in order to promote the high quality of experts in the consultation system 102. The evaluation may comprise scoring or ranking experts based on various elements. For example, the quality control engine 310 may access and review feedback associated with each expert and score each expert accordingly. The quality control engine 310 may also review other factors which may increase or decrease an expert's score or ranking. The exemplary payment engine 312 manages pricing options and the payment of fees. In accordance with exemplary embodiments, users pay experts for accepted answers to their questions, for example, by way of payments per questions, payments per answers, payments per time frame, or payments on a subscription basis. In some instances, the user may provide a deposit in order to view answers prior to accepting the answers. The payment engine 312 may maintain a record of all these transactions. Additionally, the payment engine 312 may work with the application server 210, if provided, to process payments (e.g., credit card processing, PayPal processing).

The exemplary channel management engine 314 manages the creation of new channels in the consultation system 102. A new channel may comprise a new category or a new affiliate relationship on the consultation system 102. In some embodiments, the new category may be placed on a test site of the consultation system 102. However, questions may be posted to a main site of the consultation system 102 so that experts on the main site may also provide responses to the questions. Should the new category prove to be successful, the new category may then be moved to a main site of the consultation system 102. The new affiliate relationship results in the affiliate system 110 being linked to the consultation system 102.

The extent of the link is determined by the affiliate as will be discussed further below.

Figure 4:
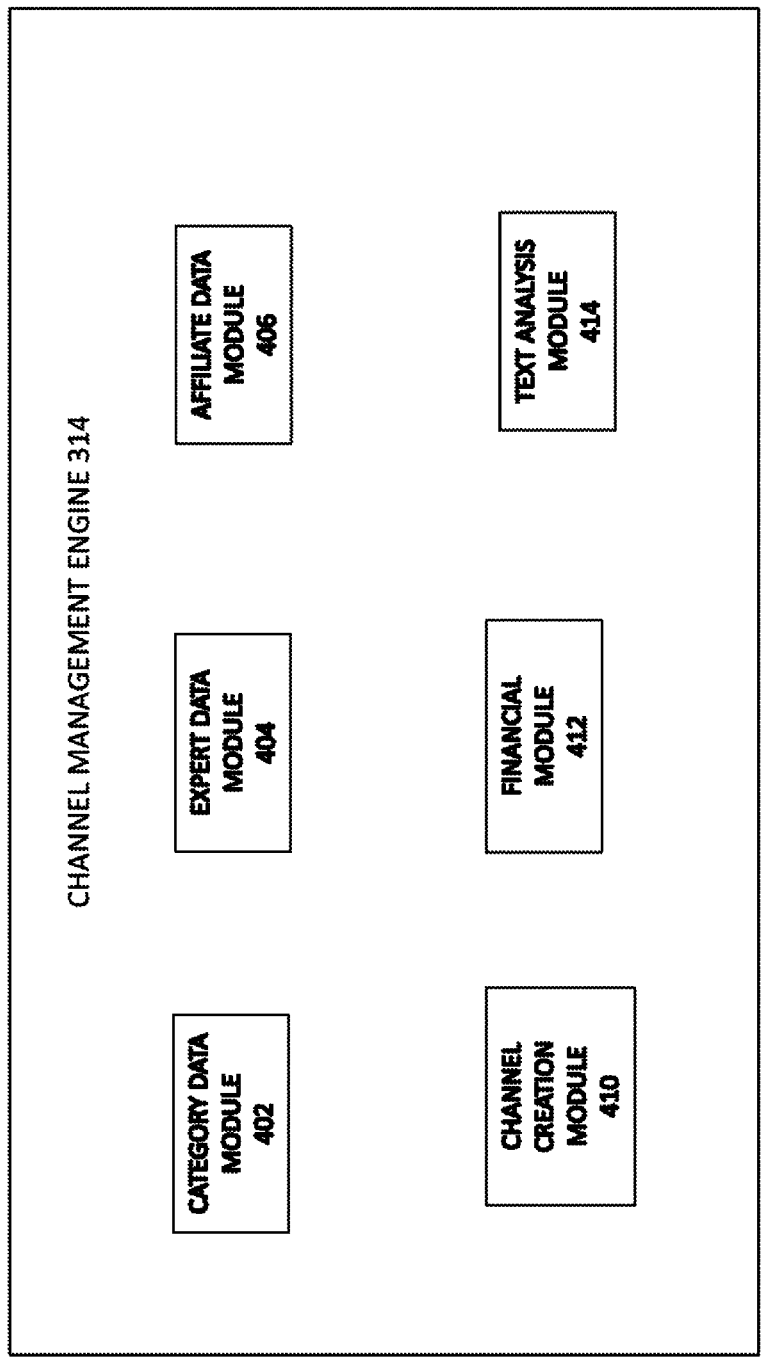
FIG. 4 is a block diagram of an exemplary channel management engine.

FIG. 4 is a block diagram of the consultation analysis engine 306. The consultation analysis engine 306 manages the questions and answers exchanged through the online consultation system 102 as well as other user and expert interactions such as processing answers or managing expert rating. In exemplary embodiments, the consultation analysis engine 306 comprises a category question processing module 402, a category selection module 404, an expert notification module 406, an answer processing module 408, a user feedback module 410, and text analysis module 414, communicatively coupled together. It is noted that some of the modules of the consultation analysis engine 306 may be embodied in other components of the consultation system 102. For example, the text analysis module 414 may be embodied in the channel management module 314. Alternatively, the topic extraction module 414 and the answer processing module 408 may be both be combined and be a part of the question processing module 402.

In one exemplary embodiment of the present invention, a text analysis module 414 may be an independent module of the Channel Management Engine 314. In an alternative embodiment, the text analysis module 414 may be embodied in the category data module 402. In an alternative embodiment, the text analysis module 414 may be embodied as part of the channel creation module 410. In yet another embodiment the text analysis module 414 may be incorporated in the channel management engine 314 or quality control engine 310.

With reference to FIG. 4, the question processing module 402 processes the submitted question from the user, including any metadata associated with the question. The question processing module may include additional features for analyzing and incorporating any details submitted through the question details page. In addition, the question processing module may filter the submitted question of any personal information such as phone numbers or address to protect the users' privacy.

The category selection module 404 operates to assign the question to the correct category. In one embodiment of the present invention, the category selection module 404 may process the user's selection of a category and assign the question to that category accordingly. In alternative embodiments, an automated categorizer may process the question body and automatically assign a category to the submitted question. In yet another embodiment, the category selection module may assign the question based on channel through which the user is posting the question. For example, if an affiliate site is related to cars, questions generated from that affiliate website may be automatically directed to the car category.

The expert selection module 406 presents posted user questions to the right expert or group of experts. In one embodiment of the present invention, the expert selection may be based on input from the user. In an alternative embodiment, the expert selection is based on the question category. So, if a particular expert was not selected by the user, the expert selection module may present the question to any expert qualified in the given category to answer the question. Alternatively, experts may be selected on a rotating basis, on the basis of their availability, their user rating and feedback, or other similar means.

In an exemplary embodiment of the present invention, an answer processing module 408 may process expert answers to posted questions, in the same manner the question processing module 402 processing user questions. In an alternative embodiment, the answers may be processed by the question processing module 402. In some exemplary embodiments of the present invention, the answer processing module 408 may send a notification to the user informing the user that his or her submitted question has been accepted by an expert or the question has been answered by an expert. In one embodiment of the present invention, the user may have to log back into the consultation system 102 to view and accept the posted answer and ask follow up questions if any.

In various embodiments of the present invention, described in general terms, the text analysis module 414 receives as input texts from questions or answers, and by applying various linguistic and/or statistical models, it processes the content of the text input. The feature extraction component of the text analysis module 414 receives content as input along with a desired set of rules to extracts relevant features from the text. So, the text analysis module 414 produces a desirable outcome (extracted features) based on the text input. In some implementation of the text analysis module 414, the given model may be perfected by allowing an iterative training to tweak and optimize the model. Additionally, in alternative embodiments, various smoothing operations may be performed to, for example, change or assign weight to any extracted feature, or drop non-relevant features all together.

Furthermore, the text analysis module 414 has the ability to recognize and output words and topics including any variants. Thus, the text analysis is not limited to a single, word or phrase but: includes variations on such identified word or phrase. For example, the identified topic "Yorkie," may also represent variants such as "Yorkshire terrier," or the word "sewing" may include "sewing machine."

In the present invention, the text analysis module 414 is used to automatically extract from a given question, keywords that are used to create a title that is representative of the question content and is optimized for Internet search engines by having a title character length that is shorter than the character length a search engine reads before characterizing and indexing the content of a document. At the same time, because the created titles are representative of their corresponding questions, an optimized title will rank high in response to a relevant query submitted to a search engine.

In exemplary embodiments of the present invention, optimized titles are created based on questions submitted to the online consultation system 102 by users. In alternative embodiments of the present invention, optimized titles may be created based on the question and answer thread, or based on answers only. It would be apparent to one of skill in the art that system and method of the present invention may be used in to create optimized titles for any desired content. The input to the text analysis module 414 as applied to automated search engine title optimization is a set of asked questions and any related metadata. The text analysis module 414 operates to identify keywords relevant and summarizing the content of a given question in a fashion optimized to rank high on a search engine inquiry. Thus, the output of text analysis module 414 may be used to promote the online consultation website by achieving higher rankings on the search engine query results. The text analysis module 414 is further described in FIG. 5 below.

Figure 5:
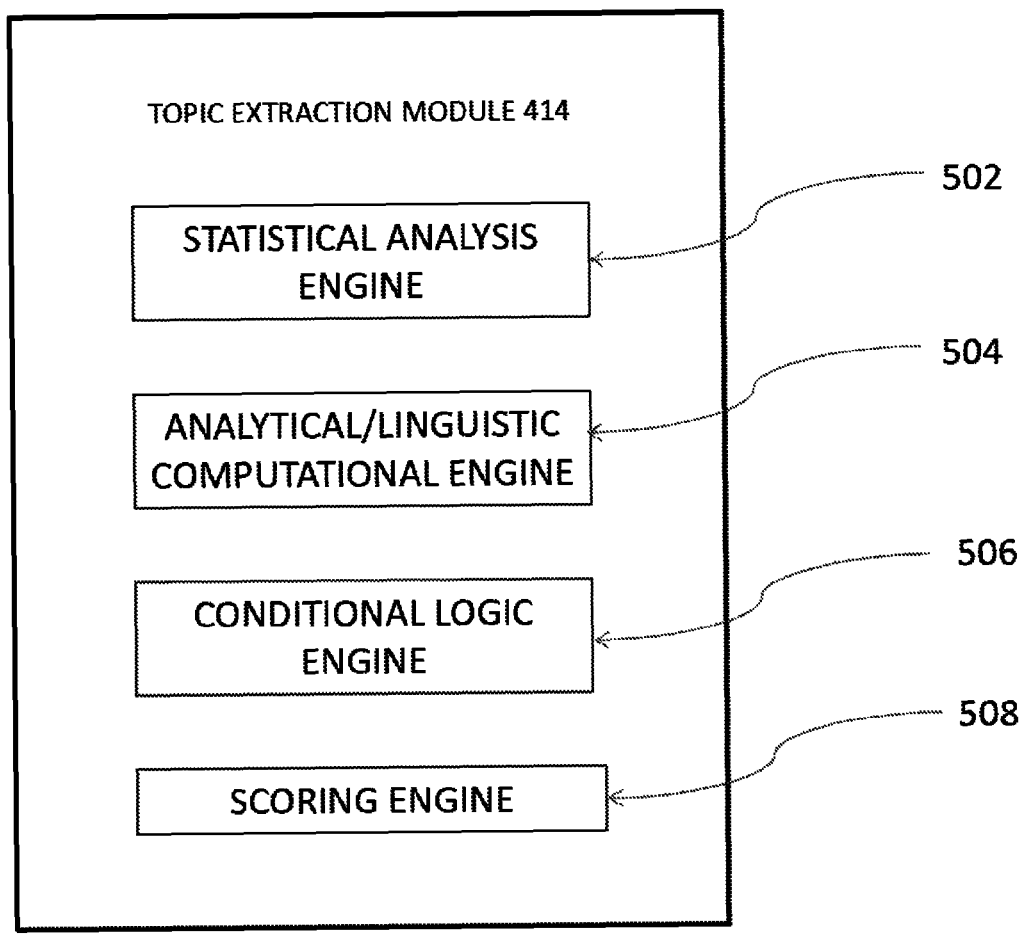
FIG. 5 is an exemplary block diagram of the text analysis module as applied to search engine optimization.

FIG. 5 is an exemplary block diagram of the text analysis module as applied to automated search engine title optimization. The exemplary consultation system 102 of the present invention may include hundreds of categories and subcategories of topics, where in each category and subcategory, many verified and vetted experts are available to answer user questions. A successful consultation system may have thousands of users submit questions in each of the many topic categories, generating a large quantity of relevant and specific content. By allowing the generated content to be available to Internet search engines, the online consultation's 102 content can turn become a valuable asset for promoting the online consultation website. For this reason, use of online content to increase traffic to a website has become a popular strategy. However, since search engines only review an arbitrary and small number of characters at the beginning of a document in order to characterize and index its content. For example, it estimated that Google uses only the first seventy characters of the text of a document to index and characterize a document and its content. In order to effectively take advantage of the search engines queries as a website promotion tool, the first few characters of a document have to be representative of the content of the document. In other words, the document titles have to be optimized to be relevant and representative of the content of the document. Thus, in the case of Google for example, unless the first seventy characters of a content that is relevant to a Google query includes the right keywords and adequately represents the content of the document, a Google search result listing will likely index the document as not very relevant to the query and will display the link to the content when presenting the results of the query. Therefore, it would be highly desirable to be able to automatically create search engine document titles that are representative of and effectively summarize the content of a question, a document or webpage, with a character length that is optimized for viewing and processing by search engines. Furthermore, the document titles would be optimized so that they are presented very high on the first page of the search results, when the result of the query is presented to the user by the search engine.

Referring now to FIG. 5, the exemplary text analysis module 414 may include a statistical analysis engine 502, an analytical/computational linguistic engine 504 (hereinafter referred to as the linguistic engine), a conditional logic engine 506, and a scoring engine 508. The following definitions shall apply to the description in this application.

A phrase is two or more adjacent words that may form a single syntactic unit in a sentence (e.g. noun phrase, verb phrase, etc.). A phrase may also be referred to as a chunk. A token is a word or other atomic element of a sentence. The skew refers to a measure of how centered a topic is within a text, or a sentence or a phrase.

In one embodiment of the present invention, the text analysis module 414 includes the statistical engine 502. The statistical engine 502 is used to build a model for topic extraction. In an exemplary embodiment of the present invention, the statistical engine 502 counts the number of occurrences tokens (word or phrases) in the question body. The statistical engine 502 may create various statistical models from the analyzed data, (e.g., a Bayesian model) in order to analyze a desired text. The output of the statistical engine 502 is candidate titles.

In an exemplary embodiment of the present invention, the linguistic engine 504 performs computational linguistics to further refine a given question under analysis. The linguistic engine 504 may perform some or all of the following tasks: sentence detection, tokenization, phrase extraction, tagging of speech parts, and phrasal chunking. The linguistic engine 504 receives as input a given text, in this case the question posted by a user, and the engine identifies the component sentences comprising the text. Additionally, the linguistic engine 504 may tokenize the sentence components and breaks down the question into component parts of various levels of abstraction: words, phrases, parts of speech (e.g. noun, adjective, etc.), concepts, etc. The linguistic engine 504 may also perform phrase extraction to; for example, extract candidate topics from the question body. The linguistic engine 504 can also tag parts of the speech used in phrasal chunking. Phrasal chunking may be used to create candidate titles. The process flow of the various operations performed by the linguistic engine 504 will be further described in reference to FIG. 7, herein below. Word segmentation (identifying a sentence's component words) can be performed both algorithmically and statistically. In one exemplary embodiment of the present invention, a statistical modeling approach may be used to improve accuracy of the word segmentation. Likewise, phrases can be determined both algorithmically and statistically, and in some exemplary embodiments of the present invention, a blended algorithmic/statistical approach may be used. A simple version of the linguistic engine 504 constructs all two and three word phrases that do not contain a stop word (a primarily functional word like "the" or "and" that contains limited semantic meaning). This phrasal extraction may produce low quality phrases. However, as further described below, the scoring engine 508 finds the most useful phrases and may discard the rest.

In exemplary embodiments of the present invention, the conditional logic engine 506 applies certain conditions to the candidate titles to further filter the results. The conditional logic engine 506 can be used to select topics and titles with a high degree of specificity while filtering out low quality topics and titles.

The scoring engine 508 may be used to score the candidate titles. In this case, a modified version of Term Frequency, Inverse Document Frequency (TFIDF) may be used. TFID is a well-known scoring formula used commonly in information retrieval. TFIDF scoring is most commonly used in the context of document retrieval. When scoring a word or phrase for a given document, the standard TFIDF score is increased for every occurrence in the document (Term Frequency) and decreased for every document that contains it (Inverse Document Frequency). This favors documents about the term or phrase, but not as much if the term or phrase is seen in a lot of places, and therefore probably not very specific. In the exemplary embodiment of the present invention, the IDF penalty is set to a high value to obtain more specific topics. Since the final optimized titles do not have to be specific to particular category, the minimum outcome ratio, determining the minimum proportion of topic appearances in a particular category, may be set to a low value. The IDF threshold value is iteratively adjusted down until topics are identified. In alternative embodiments of the present invention, ontologies specific to specific technical fields may be used to help with better topic identification. For example, for questions related to the medical field, the appropriate ontology assures that names of human body parts are identified as topics. In alternative embodiments of the present invention, either the conditional logic engine 506 or the scoring engine 508 or both may be used to sort: the candidate titles and help select the best titles.

Figure 6:
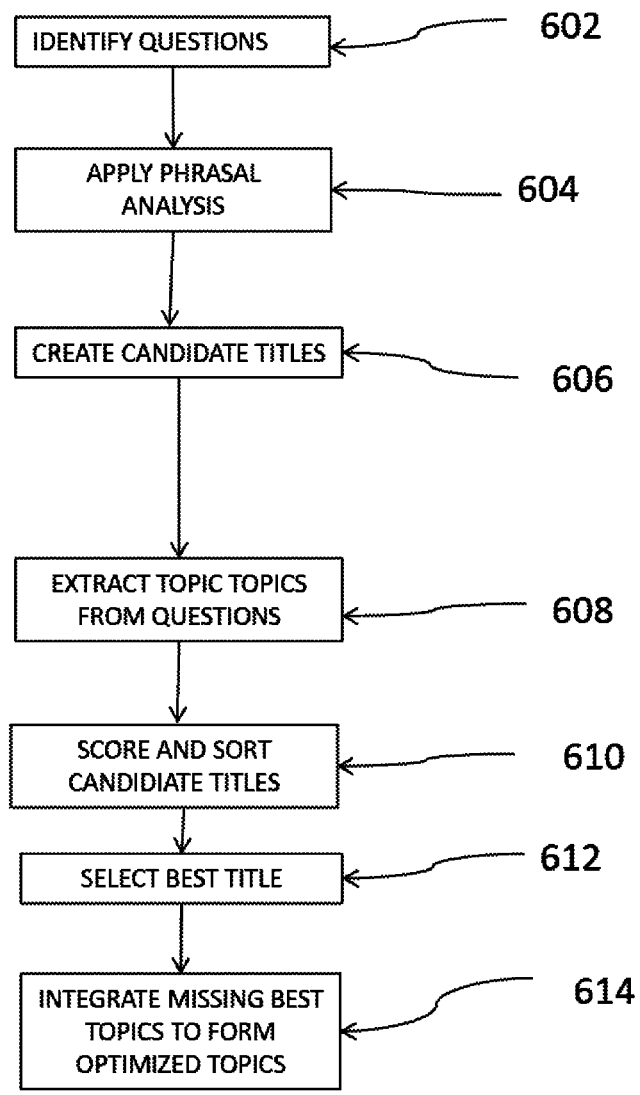
FIG. 6 shows an exemplary flowchart of a method of automatically creating optimized document titles for search engines.

FIG. 6 shows an exemplary flowchart of a method of automatically creating optimized document titles for search engines. The optimization of the titles for relevance increases the attractiveness of the question content to both users and search engines. With reference to FIG. 6, in operation 602, a copy of a question is retrieved from the database of questions. In alternative embodiments, as a question is submitted to the online consultation system 102, the creation and optimization of a representative question title is done immediately. The underlying assumption with this process is that the questions and answer threads generated by the online consultation system 102 include content: that is relevant to a query that a user may submit using a commercial search engine. Because the stored question includes content that is relevant to the search engine query, search engine optimization or SEO requires that a title of an appropriate character length be created that would provide an accurate representation of the content of the question. The question title has to be optimized based on the maximum length of characters a search engine views and processes when indexing the content of a document or text. The maximum title length also referred to as the maximum size varies from search engine to search engine. For example, it is estimated that Google optimized titles need to be less than seventy character long to be most effective. In operation 604, once the question for which a representative title is to be created and optimized is retrieved from the database or received through submission to the online consultation website 102 by a user, the question is parsed into various sentence components through phrasal analysis. In one embodiment of the present invention, the text analysis is performed by the text analysis module 414. Phrasal parsing may include parsing the text into component tokens and chunks.

In operation 606, candidate titles are created by grouping the component tokens and chunks in various combinations while keeping the length of the title under the maximum size.

In operation 608, relevant topics contained in each candidate title are identified. In operation 610, the candidate titles are sorted and ranked based on the number of topics each contains and a score assigned to each topic. In exemplary embodiments of the present invention, the scoring of the topics may be based on criteria such as length of the title, position within the text, and the amount of context surrounding the topics in the title. In operation 612, the highest ranked candidate title is selected as the potential optimized title. If the potential optimized title is missing one or more of the best topics, in operation 614, those topics are appended to the potential optimized title until the maximum size is reached and the optimized title formation is complete. In an alternative embodiment, in operation 614, candidate titles including missing topics are appended to the optimized title if the combined character length falls below the maximum size.

Figure 7:
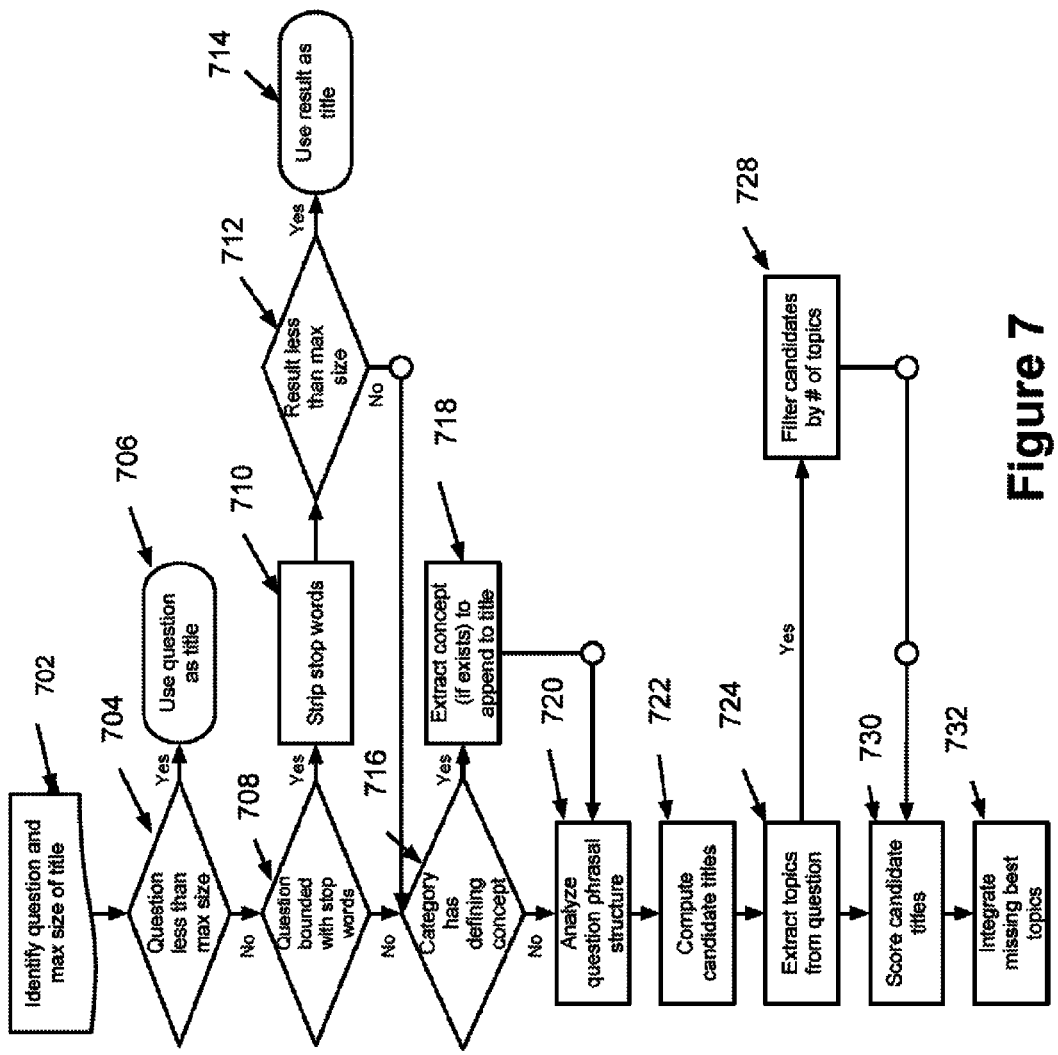
FIG. 7 shows an exemplary detailed flowchart of a method for automatically optimizing search engine titles used for website promotion.

FIG. 7 shows an exemplary flowchart of a detailed method for automatically optimizing titles used for improved relevance and search engine ranking. As an aid to better understanding the effects of each operation on a given question, the below question will be used as an illustrative example throughout the description of FIG. 7. The user posted question is: "I was speaking with Mike Myers about a problem with my 1997 Nissan Sentra. I am trying to change the PVC valve and can't locate it. Can you provide me a diagram of where the PVC valve is located?"

Referring now to FIG. 7, in operation 702, the question to be analyzed is selected and broken up into its sentence components. Additionally, a maximum title size corresponding to a given search engine is determined. The maximum title size (max size) may vary for each search engine. The maximum size (max size) corresponds to the number of characters a search engine uses for indexing and characterizing the content of a question, a web page or document. It would be apparent to one of skill in the art that if a title is longer than the maximum size, the extra characters would be ignored and not contribute to the characterization of the content of the document by the search engine. As a result, the value of the title character size may be customized for a particular search engine. Alternatively, in order to simplify processing, title character size may be set to the lowest maximum size used by any search engine. In operation 704, the question character length is compared to the maximum size.

In operation 706, if the question character length is found to be less than the max size, the entire text of the question is selected to be the search engine optimized question title.

If the question character length is found to be longer than the maximum size, the process continues in operation 708. In operation 708, stop words bounding the question are identified. Stop words are words that have little semantic meaning attached to them. Examples of stop words are: "the" or "a."

In operation 710, stop words bounding the question are stripped out. Next, in operation 712, the question character length with the stop words stripped out is compared to the max size.

In operation 714, if the new question character length is found to be less than the max size, the question without the bounding words is selected as the question title. If however the question character length without the stop words is found to be larger than the max size, the process continues in operation 716.

In operation 716, concepts that define the question category are identified. In the exemplary online consultation system 102 of the present invention, users post their question in a given category. Even in the cases were users do not select a category, an automated categorizer may associate the question with a category, or alternatively a platform administrator or moderator may assign a subject category to the submitted question. An example of a concept defining a category may be the make and model of the car in an automobile category. In the example question: "I was speaking with Mike Myers about a problem with my 1997 Nissan Sentra. I am trying to change the PVC valve and can't locate it. Can you provide me a diagram of where the PVC valve is located?": the category of the question is the automobile category, and thus the category concept will be "1997 Nissan Sentra" Which is the make and model of the car that is the subject of the question.

In operation 718, if category defining concepts were found to be present in the question content, the category defining concepts are extracted from the question text. As further described below, in exemplary embodiments of the present invention, in fugal stages of creating a SEO optimized title, the extracted category concepts may be appended to the search engine optimized title, in a later operation.

In operation 720, the question's phrasal structure is analyzed. The phrasal analysis will locate the position of sentence components such as the noun phrases or verb phrases, etc. In exemplary embodiments of the present invention, the linguistic engine 504 may be performing the phrasal analysis of the question. The linguistic engine 504 may perform some or all of the following tasks: sentence detection, tokenization, phrase extraction, tagging of speech parts, and phrasal chunking. The linguistic engine 504 receives as input a given text, in this case the question posted by a user, and the engine identifies the component sentences comprising the text. In exemplary embodiments of the present invention, off-the-shelf statistical modeling tools may be used to perform various phrasal structure analysis. For example, in one embodiment of the present invention, Open Natural Language Processing tool also referred to as OpenNLP processing tool was used to perform part of the phrasal structure analysis such as sentence detection, tokenization, etc. The Apache OpenNLP library is a machine learning based toolkit for the processing of natural language text and information about it may be found at http://opennlp.apache.org.

In the example below, the results of the phrasal analysis is shown including tokenization and parsing of the sentence into chunks as applied to our sample question.

Phrasal Analysis

Sentence 1:

| | 0 | 1 | 2 | 3 | 4 | 5 | 6 | 7 | 8 |
|---|---|---|---|---|---|---|---|---|---|
| Tokens: | I | was | speaking | with | Mike | Myers | about | a | problem |
| Chunks: | [NP] | [------VP------] | | [-PP-] | [----NP-----] | | [-PP--] | [----NP---] | |
| | 9 | 10 | 11 | 12 | 13 | 14 | | | |
| | with | my | 1997 | Nissan | Sentra | . | | | |
| | [NP----] | [-PP-] | [-----------NP------------] | | | | | | |

Sentence 2:

| | 0 | 1 | 2 | 3 | 4 | 5 | 6 | 7 | 8 |
|---|---|---|---|---|---|---|---|---|---|
| Tokens: | I | am | trying | to | change | the | PVC | valve | and |
| Chunks: | [NP] | | [----------VP----------] | | | [------NP-------] | | | |
| | 9 | 10 | 11 | 12 | 13 | | | | |
| Tokens: | ca | n't | locate | it | . | | | | |
| Chunks: | [----VP--------] | | | [NP] | | | | | |

Sentence 3:

| | 0 | 1 | 2 | 3 | 4 | 5 | 6 | 7 | 8 | 9 |
|---|---|---|---|---|---|---|---|---|---|---|
| Tokens: | Can | you | provide | me | a | diagram | of | where | the | PVC |
| Chunks: | [NP-] | | [--VP-------] | [NP] | [----NP----] | | [PP] | [ADVP-] | [------NP- | |
| | 10 | 11 | 12 | 13 | | | | | | |
| | valve | is | located | ? | | | | | | |
| | -----] | | [----VP-----] | | | | | | | |

Once the phrasal analysis is performed, in operation 722, candidate titles are computed. Candidate titles are created by identifying important components such as noun phrase, intransitive verb, or the last phrase in the text from the question text, and combining the components into candidate titles. Creation or computation of candidate titles will be described in more detail in FIG. 8 below. Sample candidate titles computed for our example question is shown below:

Candidate Titles
1. [I am] trying to change the PVC valve
2. [I am] trying to change the PVC valve and can't locate it
3. [the] PVC valve
4. [the] PVC valve and can't locate it
5. [you] provide me a diagram
6. [you] provide me a diagram of the PVC valve
7. diagram
8. diagram of where the PVC valve
9. diagram of where the PVC valve is located
10. [the] PVC valve
11. [the] PVC valve is located The above candidate titles are formed from the components of the above example question. In this example, the only limitation in computing the candidate titles was that each candidate title should include at least one topic and contain less than the maximum number of characters. In alternative embodiments, there may also be linguistic rules requiring where candidate titles can begin and end. In an alternative embodiment, the filter parameter may be set to a number greater than one, e.g. two. A setting of two would mean that only candidate titles with at least two or more topics are considered and candidate titles with one or less candidate topics will be discarded. The bracketed text is the uninteresting prefix text that is removed prior to further analysis.

In operation 724, candidate topics are extracted from the question contents. In an exemplary embodiment of the present invention, a statistical model of all the topics found in a category is created. Based on the statistical model, each question is analyzed and the best topics for a given question are identified and extracted through filtering and scoring all the topics corresponding to that question. The topic extraction process is described in further detail in FIG. 9.

Once candidate topics for a given question are identified, in operation 728, the candidate titles are filtered by the minimum number of topics each contains. In an exemplary embodiment of the present invention, only the candidate titles with the largest number of candidate topics are selected. Illustrating this point and referring back to in the case of our example question and its corresponding candidate titles, only candidate titles #2, #8 and #9 are selected that include two topics are selected.

In the case such as the one example illustrated above where several candidate titles have the same number of candidate topics, the candidate titles are further sorted by the sum of the topic scores.

In operation 730, the candidate titles are scored and sorted and the best title is selected. In addition to candidate titles with the highest number of candidate topics included, candidate titles may also be sorted by the sum of the candidate topic scores. So, in the case our example question above, candidate title #2 includes the word "can't locate" which has the lowest topic score. Therefore, candidate title #2 is eliminated as having the lowest candidate topic score leaving candidate titles #8 and #9. Alternatively or in addition to sorting by candidate topic scores, the candidate titles may be sorted based on a factor that is calculated based on the numbers of tokens each candidate title contains from which a skew value is subtracted. Conceptually, this factor that is based on the number of tokens in a candidate title minus skew value favors longer titles with the topics located more in the middle, and thus contains more context around the topics. This is because if topics in a candidate title are closer to either end of the clause, the skew factor for that candidate title is higher and the value based on the number of tokens minus the skew factor is smaller. When soiling the candidate titles by this factor, the candidate titles are sorted by the highest number of tokens minus skew value. In the case of our candidate titles #8 and #9, the sorting favors candidate title #9 because candidate title #9 includes the topic "PVC valve" in the middle of the sentence as opposed to candidate title #8, where the topic "PVC valve" is at the end of the sentence, resulting in a higher skew value for candidate tile #8 and a lower overall score. The candidate title with the highest score is selected as the best sorted candidate title.

After operation 730, it is possible to end up with the highest score candidate titles that may not include all the best candidate topics. Therefore, in one embodiment of the present invention, in operation 732, the top N candidate topics that are not already included in the highest score candidate title are selected to be appended to the highest score candidate title, depending on the character length of the best candidate title. Additionally, the category defining concept may be appended to the highest score candidate title. At this point, the formation of the search engine optimized candidate titles is complete because the best candidate title includes the best candidate topics, the category defining concept and its character length is less than the max size. In the case of the illustrative question we have used herein, the best candidate title selected as the best SEO optimized title would look like below:

"1997 Nissan Sentra: can't locate . . . diagram of where the PVC valve is located."

In an alternative embodiment of the present invention, in operation 732, the missing best topics are added to the highest score candidate titles along with the candidate titles they are contained within. In this embodiment, the candidate titles that were computed in operation 722 are sorted and only candidate titles including one or more missing topics are kept. Next, a recursive algorithm appends the candidate title with the highest number of missing topics to the best candidate title and checks to see if the combination is longer or shorter than the max size. If the combined title is less than the max size, the algorithm moves down to the next candidate title including missing topics. If the length of the combined candidate title is longer than the max size, the appended candidate title is discarded and the algorithm attempts to append the next candidate title with a missing topic to the best candidate title. One advantage of this embodiment is that since the missing topics are appended along with their corresponding candidate titles, the final optimized title is likely to be more readable and comprehensible.

Figure 8:
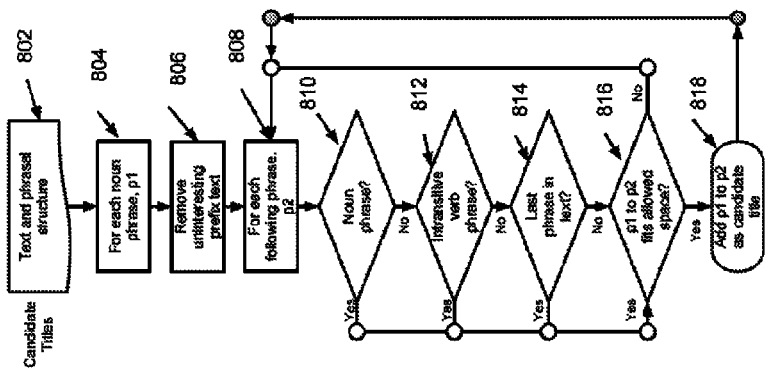
FIG. 8 shows an exemplary detailed flow chart of the process of creating candidate titles.

FIG. 8 shows an exemplary flow chart of a detailed process of computing candidate titles. In operation 802, the question requiring a search engine optimized title is parsed into its sentence components. In operation 804, a first noun phrase is identified and selected. It should be apparent to one of skill in the art that there may be situations in which the process does not have to start with a noun phrase. However, in many cases, starting with a noun phrase is more appropriate. For example, for the text "John kicked the ball", the title could start with "John" but not "kicked".] In operation 806, the uninteresting prefix text surrounding the first phrase is removed. Examples of uninteresting prefix text are "I am", "the", "you", etc].

Next, in operation 808 an iterative process is started to create a candidate title. The process is repeated for each noun phrase, intransitive phrase until the last phrase is reached. So, in an exemplary embodiment, after the first noun phrase is selected, if the next phrase is identified as a noun phrase 810, intransitive verb phrase 812, or the last phrase in the text 814, the last phrase is selected as a candidate for to the end of the candidate title. The candidate title should not end with a transitive verb because that could mean information is missed. For example, "John kicked" is missing some important information—the object. In operation 816, if the combined length of the new candidate title from P1 (the start of the candidate title) and through P2 (a noun phrase, intransitive verb or last phrase) is determined to be less than the max size, then the text from P1 to P2 is used to form the new candidate title. Unless the new phrase P2 appended was the last phrase in the question, the iterative process continues starting in operation 808.

Figure 9:
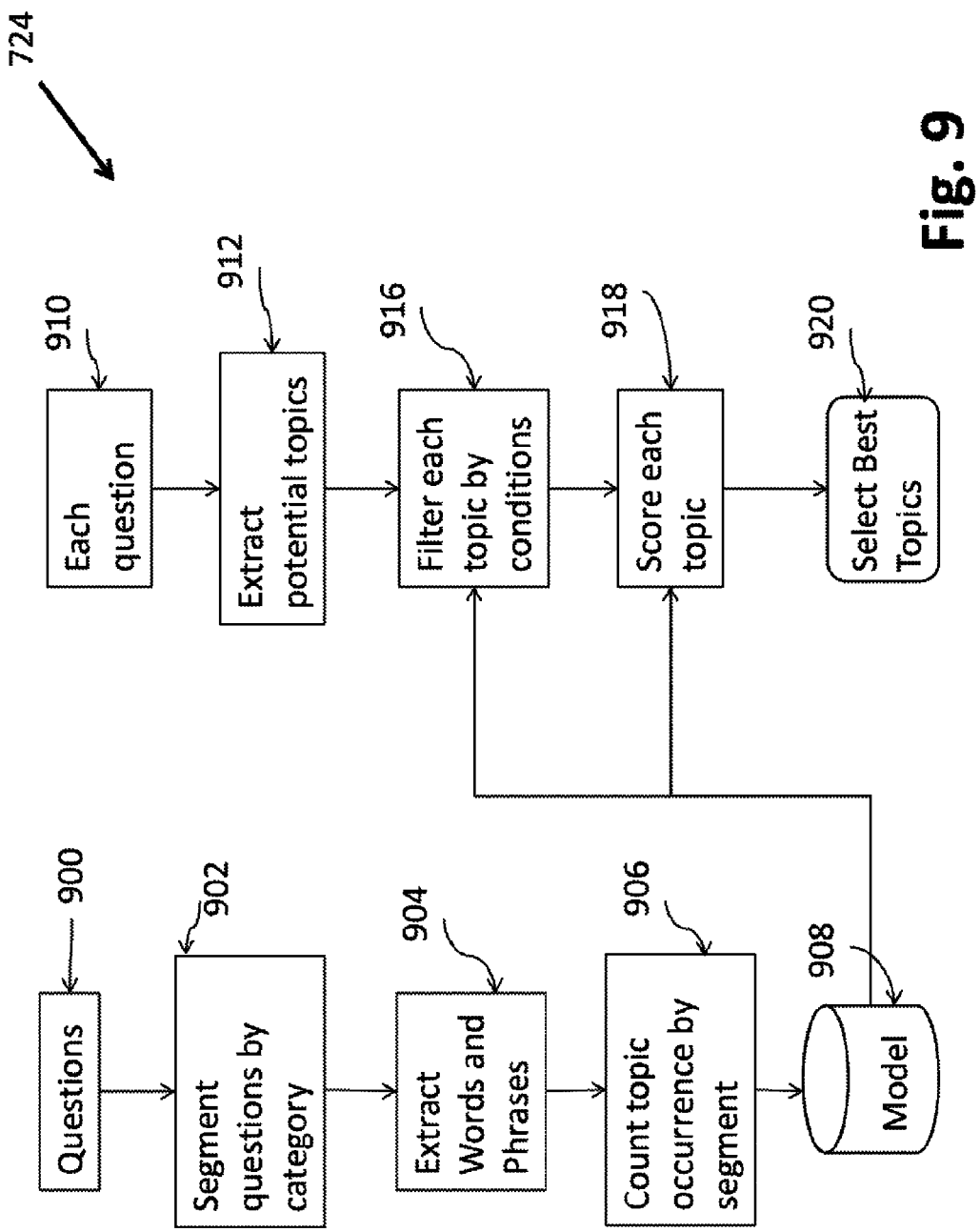
FIG. 9 shows an exemplary detailed flow chart of the process of identifying question topics.

FIG. 9 shows an exemplary detailed flow chart of the process of identifying question topics. In operation 900, the question database is accessed and each stored question is retrieved. In operation 902, the questions are divided into their respective categories. In operation 904, for each question, the words and phrases are extracted from all the questions. The words and phrases correspond to topics present in each question. In operation 906, the occurrence of each topic within a segment is counted and a statistical model 908 of all topics in a category is created. In alternative embodiments of the present invention, the statistical model may be fine-tuned by filtering certain topics that may not appear to frequently or may be too generic.

Once the statistical model 908 of the question topics is created, in operation 910, the question requiring an optimized title is retrieved.

In operation 912, any words and phrases corresponding to potential or candidate topics present are extracted from the question requiring a search engine optimized title. In operation 916, the extracted topics are filtered using various logical condition filters. For example, only topics present in the question and that have occurred in the category more than 20% of the time are selected.

In operation 918, the extracted topics are scored and further filtered based on their assigned score. The scoring of a topic may be based on the number of occurrence of a topic within the category and within the question under analysis. In one embodiment of the present invention, the scoring of the topics is done using a modified version of Term. Frequency, Inverse Document Frequency (TFIDF) technique. TFIDF helps identify candidate topics that are specific to the category and the question. In one embodiment of the present invention, every occurrence of a topic within the category under analysis results in an increasing topic score while the occurrence of the topic in other categories may result in reducing the topic's score. Higher frequency of occurrence of a topic within a category implies that the topic is specific the category while the high frequency of occurrence of the topic in all questions implies that the topic is not specific to a given category and thus should not have a high score.

In operation 920, the highest sewing topics are selected as the best topics also referred to as candidate topics, corresponding to the question under analysis. In one embodiment of the present invention, a single best topic may be selected; while in other embodiments, multiple best topics with a score greater than a given threshold may be selected.

In alternative embodiments of the present invention, a very high IDF penalty may be selected in order to get more specific topics. If no candidate topics are identified, in an iterative process, the IDF penalty parameters are reduced and reapplied to the question. The process continues until one or more topics are identified.

Figure 10:
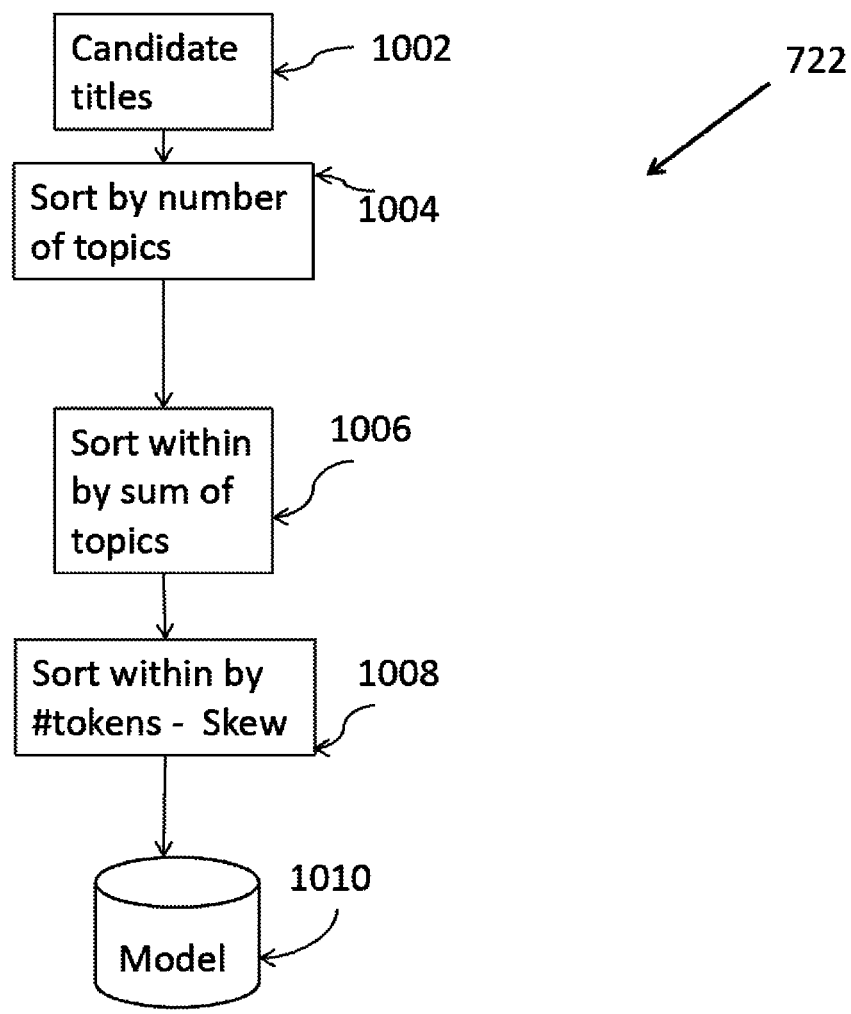
FIG. 10 shows an exemplary flow chart of a process of sorting and selecting the SEO optimized title.

FIG. 10 shows an exemplary flow chart of a process of sorting and selecting the search engine optimized titles. In operation 1002, all the candidate titles corresponding to a particular question are selected. In operation 1004, the question titles are sorted by the number topics each contain. The candidate titles with higher number of topics are preferred over candidate titles with fewer topics.

In operation 1006, the candidate titles are further sorted by the sum of the topic scores each contain. In the process of identifying relevant topics within a category and a question, each topic is assigned a score. Counting the number of topics present in each question and the score of each topic, the candidate titles are ranked from the highest sum of the topic scores to the lowest sum of the topic scores.

In operation 1008, the candidate titles are further sorted and ranked by a score based on the number of tokens present in each candidate title minus the skew corresponding to each topic. This type of scoring should favor candidate titles that are longer and have topics that are located closer to the middle of the sentence. In operation 1010, based on the various rankings, the best candidate title is selected.

Modules, Components, and Logic

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, user, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry or in temporarily configured circuitry (e.g., configured by software) may be driven by, for example, cost, time, energy-usage, and package size considerations.

Accordingly, the term module or engine should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Exemplary Machine Architecture and Machine-Readable Medium

Figure 11:
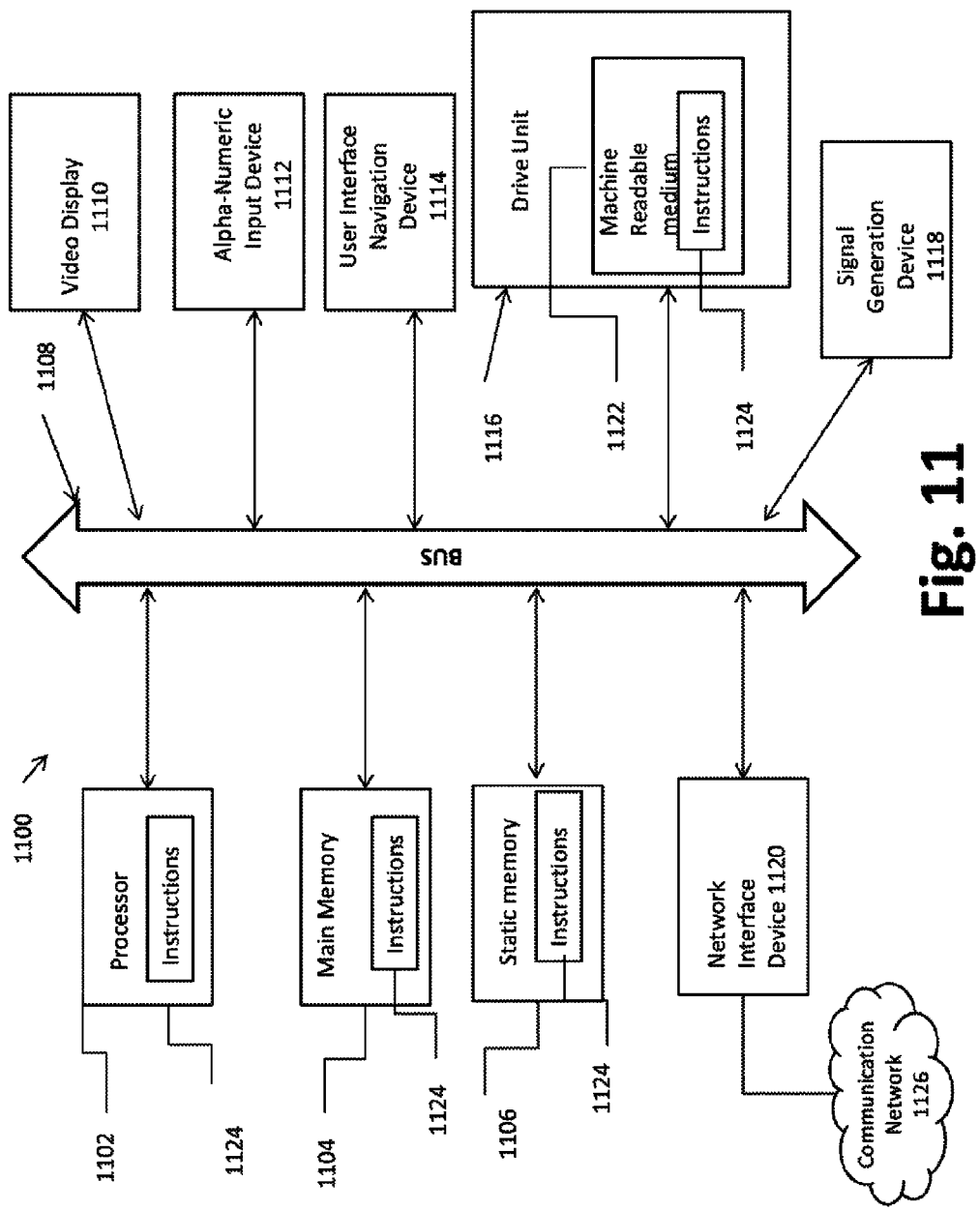
FIG. 11 shows a simplified block diagram of a digital device within which a set of instructions, for causing the machine to perform any one or more of the methodologies discussed herein, may be executed.

With reference to FIG. 11, an exemplary embodiment extends to a machine in the exemplary form of a computer system 1100 within which instructions for causing the machine to perform any one or more of the methodologies discussed herein may be executed. In exemplary embodiments, the computer system 1100 may be any one or more of the user 106, the expert user 108, affiliate system 110, and servers of the consultation system 102. In alternative exemplary embodiments, the machine operates as a standalone device or may be connected (e.g., networked) to other machines. In a networked deployment, the machine may operate in the capacity of a server or a user machine in server-user network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 may include a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). In exemplary embodiments, the computer system 1100 also includes one or more of an alpha-numeric input device 1112 (e.g., a keyboard), a user interface (UI) navigation device or cursor control device 1114 (e.g., a mouse), a disk drive unit 1116, a signal generation device 1118 (e.g., a speaker), and a network interface device 1120.

Machine-Readable Medium

The disk drive unit 1116 includes a machine-readable medium 1122 on which is stored one or more sets of instructions 1124 and data structures (e.g., software instructions) embodying or used by any one or more of the methodologies or functions described herein. The instructions 1124 may also reside, completely or at least partially, within the main memory 1104 or within the processor 1102 during execution thereof by the computer system 1100, the main memory 1104 and the processor 1102 also constituting machine-readable media.

While the machine-readable medium 1122 is shown in an exemplary embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of exemplary semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. The term "machine-readable medium" shall also be taken to include any non-transitory storage medium.

Transmission Medium

The instructions 1124 may further be transmitted or received over a communications network 1126 using a transmission medium via the network interface device 1120 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the exemplary configurations may be implemented as a combined structure or resource. Similarly, structures and functionality presented as a single resource may be implemented as separate resources.

These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A computer-implemented method of optimizing search engine titles for higher ranking of search results, the method comprising:
   selecting a content in which search engine title optimization is desired;
   parsing the content into linguistic components;
   identifying topics included in the parsed content;
   computing candidate titles based on various grouping of the content topics;
   sorting the candidate titles based on the number of topics in each candidate title;
   setting a maximum size, wherein the maximum size is a character length that is less than or equal to a maximum number of characters the search engine will process when characterizing the content; and
   selecting, using a processor, the candidate title sorted the highest that is less than or equal to the maximum size as the optimized title.

2. The method of claim 1, wherein creating an optimized title further comprises:
   integrating missing best topics to the optimized title; and
   comparing the optimized title to the maximum size.

3. The method of claim 2, wherein the candidate titles including the best missing topics missing are appended to the optimized title.

4. The method of claim 1 wherein identifying content topics further comprises:
   creating a model for all topics included in all content submitted in a given subject category;
   extracting potential topics from the content;
   applying conditional filtering to each potential topic;
   scoring each filtered topic; and
   identifying the best topic based on the score.

5. The method of claim 1, wherein soiling the candidate titles further comprises:
   sorting the candidate titles by the sum of the topic scores.

6. The method of claim 1, wherein scoring the candidate titles further comprises:
   sorting the candidate titles by the number of tokens contained minus the skew for each topic.

7. The method of claim 1, wherein the comparing of the question character length to the maximum size is done after stripping stop words from the question.

8. The method of claim 1, wherein the optimized title is used to promote traffic to an online consultation website.

9. A content search engine title optimization apparatus for creating optimized titles representative of the content and optimized for a search engine, the apparatus comprising:
   a processor;
   memory connected to the processor;
   instructions stored on the memory, that when executed by the processor, perform the following:
   selecting a content in which search engine title optimization is desired;
   parsing the content into linguistic components;
   identifying topics included in the parsed content;
   computing candidate titles based on various grouping of the content topics;
   sorting the candidate titles based on the number of topics in each candidate title;
   setting a maximum size, wherein the maximum size is a character length that is less than or equal to a maximum number of characters the search engine will process when characterizing the content; and
   selecting, using a processor, the candidate title sorted the highest that is less than or equal to the maximum size as the optimized title.

10. A non-transitory machine-readable storage medium having embodied thereon instructions which when executed by at least one processor, causes a machine to perform operations comprising:
    selecting a content in which search engine title optimization is desired;
    parsing the content into linguistic components;
    identifying topics included in the parsed content;
    computing candidate titles based on various grouping of the content topics;
    sorting the candidate titles based on the number of topics in each candidate title;
    setting a maximum size, wherein the maximum size is a character length that is less than or equal to a maximum number of characters the search engine will process when characterizing the content; and
    selecting, using a processor, the candidate title sorted the highest that is less than or equal to the maximum size as the optimized title.

* * * * *